(12) United States Patent
Gomann et al.

(10) Patent No.: US 9,358,855 B2
(45) Date of Patent: Jun. 7, 2016

(54) AIR SUSPENSION SYSTEM OF A MOTOR VEHICLE

(71) Applicant: WABCO GmbH, Hannover (DE)

(72) Inventors: Tobias Gomann, Brevoerde (DE);
Michael Haverkamp, Hannover (DE);
Andreas Rutsch, Hannover (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 14/362,280

(22) PCT Filed: Dec. 6, 2012

(86) PCT No.: PCT/EP2012/005046
§ 371 (c)(1),
(2) Date: Jun. 2, 2014

(87) PCT Pub. No.: WO2013/091787
PCT Pub. Date: Jun. 27, 2013

(65) Prior Publication Data
US 2014/0319788 A1    Oct. 30, 2014

(30) Foreign Application Priority Data

Dec. 21, 2011    (DE) .......................... 10 2011 121 753

(51) Int. Cl.
*B60G 17/052* (2006.01)
*B60G 17/015* (2006.01)
(Continued)

(52) U.S. Cl.
CPC ........ *B60G 17/0523* (2013.01); *B60G 17/0155* (2013.01); *B60G 21/073* (2013.01);
(Continued)

(58) Field of Classification Search
CPC ........... B60G 17/0523; B60G 17/0525; B60G 21/073; B60G 21/106; B60G 17/0155; B60G 2500/2021; B60G 2800/202; B60G 2300/14; B60G 2800/019; B60G 2800/912; B60G 2800/0194; B60G 2800/915; B60G 2300/38; B60G 2500/32; Y10S 280/01
See application file for complete search history.

(56) References Cited

U.S. PATENT DOCUMENTS 2,967,065 A * 1/1961 Schwendner .............. 280/6.158
3,035,851 A * 5/1962 Stengelin ................... 280/5.503
(Continued)

FOREIGN PATENT DOCUMENTS

DE    195 44 622 C1    9/1996
DE    195 15 255 A1    10/1996
(Continued)

*Primary Examiner* — Paul N Dickson
*Assistant Examiner* — Timothy Wilhelm
(74) *Attorney, Agent, or Firm* — Kramer Levin Naftalis & Frankel LLP

(57) ABSTRACT

A vehicle air suspension system includes at least two spring bellows assigned to pneumatic springs on opposite vehicle sides of a vehicle axle. The springs can be connected via connection lines, each of which is provided with a level-regulating valve, to a main pressure line and can be shut off with respect thereto. The main pressure line can be connected via a main pressure valve alternately to a compressed air source and to a compressed air sink. The connection lines of the spring bellows are connected to each other via a connection line provided with a throttle and can be shut off by a shut-off valve. A mechanically activatable shut-off valve is coupled to one of the level-regulating valves arranged on the offside of the vehicle such that the shut-off valve is open when the level-regulating valve is closed and is closed when the level-regulating valve is open.

7 Claims, 4 Drawing Sheets

(51) Int. Cl.
  *B60G 21/073* (2006.01)
  *B60G 21/10* (2006.01)

(52) U.S. Cl.
  CPC .......... *B60G21/106* (2013.01); *B60G 2300/14* (2013.01); *B60G 2300/38* (2013.01); *B60G 2500/2021* (2013.01); *B60G 2500/32* (2013.01); *B60G 2800/019* (2013.01); *B60G 2800/0194* (2013.01); *B60G 2800/202* (2013.01); *B60G 2800/912* (2013.01); *B60G 2800/915* (2013.01)

(56) References Cited

U.S. PATENT DOCUMENTS

| | | | | |
|---|---|---|---|---|
| 3,037,788 A | * | 6/1962 | Haddad | 280/6.159 |
| 3,342,503 A | * | 9/1967 | Alfieri et al. | 280/6.16 |
| 3,572,747 A | * | 3/1971 | Pollinger et al. | 280/5.503 |
| 4,238,128 A | * | 12/1980 | McKee | 280/6.152 |
| 4,673,172 A | * | 6/1987 | Blanz | B60G 17/0525 267/64.11 |
| 4,834,418 A | * | 5/1989 | Buma et al. | 280/124.106 |
| 4,958,850 A | * | 9/1990 | Buma et al. | 280/6.157 |
| 5,193,849 A | * | 3/1993 | Holzmann | 280/6.152 |
| 5,261,691 A | * | 11/1993 | Laichinger et al. | 280/6.157 |
| 5,273,308 A | * | 12/1993 | Griffiths | 280/6.151 |
| 6,089,551 A | * | 7/2000 | Haviland et al. | 267/64.16 |
| 6,196,555 B1 | * | 3/2001 | Gaibler | 280/6.154 |

FOREIGN PATENT DOCUMENTS

| | | |
|---|---|---|
| DE | 102 23 405 A1 | 12/2003 |
| DE | 10 2005 032 219 A1 | 1/2007 |
| EP | 0 779 168 A2 | 6/1997 |
| WO | WO 2007/095207 A1 | 8/2007 |

\* cited by examiner

AIR SUSPENSION SYSTEM OF A MOTOR VEHICLE

FIELD OF THE INVENTION

The present invention generally relates to an air suspension system of a motor vehicle.

BACKGROUND OF THE INVENTION

Air suspension systems have significant advantages in relation to conventional steel suspension systems and are therefore being increasingly used both in commercial vehicles such as trucks and buses and in primarily heavy passenger cars, such as luxury sedans and SUVs. An air suspension system makes possible ride height control independent of load, since the actual load state can in each case be compensated for by adaptation of the bellows pressure in the spring bellows of the air springs. Likewise, because of the progressive spring characteristics of the air springs, an air suspension system provides especially secure contact of the wheels with the road surface and a comfortable response to bump and rebound movements of the wheels. A further advantage of air suspension systems is that the ground clearance of the vehicles can be varied as required, being increased for off-road use, for example, and reduced for fast driving on motorways. In the case of commercial vehicles, there is the added advantage that the vehicle superstructure can be lowered or set to a suitable height when loading and unloading. For example, the vehicle frame of a pneumatically sprung truck or trailer can be lowered to set down, and raised to receive, an interchangeable platform. Likewise the loading floor of a truck can be adjusted to the level of a loading ramp by reducing or increasing the rear axle bellows pressure to facilitate loading and unloading. In the case of pneumatically sprung buses, the vehicle superstructure on the curbside of the vehicle can be lowered by venting compressed air from the spring bellows on that side to facilitate the entry and egress of passengers and then raised again by recharging the spring bellows.

If the vehicle superstructure is to be raised and lowered only equally at one vehicle axle, a single level-regulating valve is sufficient for charging and venting the spring bellows concerned. In this case, in order to compensate automatically, by means of a small exchange of compressed air, for pressure differences that may occur, for example, through leakage losses on one side, in many air suspension systems a throttled connection between the two or more air spring bellows is provided in the inactive state, that is, with the level-regulating valve closed.

A corresponding valve arrangement is known, for example, from the air suspension system according to DE 195 44 622 C1. In an embodiment of this known air suspension system according to FIG. 5 of that document, the two spring bellows associated with air springs arranged on opposite vehicle sides of a vehicle axle can be charged and vented via a single level-regulating valve and two combined connecting lines. A 3/2-way switching valve by which the two connecting lines are connected to the level-regulating valve in a first switching position (inactive position) and are shut off with respect to the level-regulating valve and connected to one another via a throttle in a second switching position (actuating position) is connected downstream of the level-regulating valve in the venting direction. By means of corresponding activation of an associated pilot valve, the 3/2-way switching valve is held in the actuating position while driving, so that a limited compressed-air or pressure compensation between the two spring bellows can take place. However, one-sided lowering and raising of the vehicle superstructure is not possible with this known air suspension system.

DE 10 2005 032 219 B4 describes embodiments of an air suspension system in which the two spring bellows associated with air springs arranged on opposite vehicle sides of a vehicle axle can each be charged and vented via a respective level-regulating valve arranged in an associated connecting line. The connecting lines of the two spring bellows concerned are connected to one another via a connecting line provided with a throttle and can be shut off by a shut-off valve, so that the limited compressed-air and pressure compensation between the two spring bellows can be interrupted if required. Because the two level-regulating valves can be activated by a common pilot valve, one-sided lowering and raising of the vehicle superstructure is not possible with this known air suspension system.

This disadvantage of the known art can be overcome by separate activation of the two level-regulating valves. This therefore makes it possible to lower and raise the vehicle superstructure on one side, which can be utilized, in the case of a bus for example, to facilitate the entry and egress of passengers. It is also possible in this case, by unequal charging of the spring bellows in the event of unequal load distribution in a truck, to compensate for an oblique stance of the vehicle superstructure that would otherwise occur. For this purpose, however, it is necessary to block the connecting line between the spring bellows by means of the shut-off valve, since, in these cases, pressure compensation between the spring bellows would be disadvantageous and unwanted. The normal configuration of the shut-off valve as a solenoid switching valve or as a pressure-controlled switching valve activatable by a pilot valve in the form of a solenoid switching valve, represents a certain cost factor and is associated with an increased risk of malfunction.

SUMMARY OF THE INVENTION

Generally speaking, it is an object of the present invention to provide an improved air suspension system of a motor vehicle in which shutting off of the connecting line between the spring bellows when required is implemented in a simple and cost-effective manner.

In one embodiment of the present invention, the shut-off valve is configured to be activatable mechanically and is coupled to the level-regulating valve of the spring bellows arranged on the loading/unloading side of the vehicle such that the shut-off valve is open when the level-regulating valve is closed and is closed when the level-regulating valve is open.

A vehicle air suspension system includes at least two spring bellows, which are associated with air springs arranged on opposite vehicle sides of a vehicle axle and can be connected to and shut off from a main pressure line via respective connecting lines each provided with a level-regulating valve. If the motor vehicle has a tandem axle, or two vehicle axles mounted a short distance apart, four spring bellows may analogously be involved, which spring bellows are arranged in pairs on opposite sides of the vehicle, and can be connected to a main pressure line via connecting lines each provided with a level-regulating valve and can be shut off with respect to the main pressure line. The main pressure line is connectable alternately via a main pressure valve to a compressed air source and to a compressed air sink. The connecting lines of the at least two spring bellows are connected to one another via a connecting line, which is provided with a throttle and can be shut off by a shut-off valve.

In order to make it possible, in an air suspension system of this type, to shut off in a simple and low-cost manner the throttled connection between the at least two spring bellows by means of the shut-off valve during one-sided raising and lowering of the vehicle superstructure, according to an embodiment of the present invention, the shut-off valve is configured to be activatable mechanically and is coupled to the level-regulating valve of the spring bellows arranged on the loading/unloading side of the vehicle such that the shut-off valve is open when the level-regulating valve is closed and is closed when the level-regulating valve is open.

The shut-off valve is therefore automatically closed by means of the related level-regulating valve when the level-regulating valve is open for one-sided charging or venting of the spring bellows, that is, for one-sided raising or lowering of the vehicle superstructure. If, by contrast, the level-regulating valve concerned is closed, which is the case outside charging and venting processes, especially during driving, the shut-off valve is opened and a small exchange of pressure and air between the two spring bellows is therefore possible. However, automatic closing of the shut-off valve during unequal charging of the spring bellows to compensate for a laterally unequal load distribution is not possible with this valve arrangement.

In order to reduce the cost and complexity of installation, it is preferably provided that the connecting line, the throttle and the shut-off valve, at least together with the two level-regulating valves, are arranged in a common valve block. If the shut-off valve and the related level-regulating valve are arranged largely coaxially inside a common valve bore, a double valve block is sufficient with this valve arrangement. However, the switching valves and components mentioned may also be combined with the main pressure valve and further level-regulating valves, the spring bellows of which are associated with the air springs of other vehicle axles, in a common valve block.

In a preferred embodiment of the valve block, the two level-regulating valves are in the form of seat valves arranged in radially adjacent valve bores in a housing of the valve block and each have a valve plate pressed against a valve seat by a respective compression spring via a spring disk. The connecting line and the throttle are configured as a throttle bore, which connects connecting bores of the two level-regulating valves arranged in a connecting cover of the valve block. The shut-off valve is in the form of a seat valve arranged inside the level-regulating valve of the spring bellows on the loading/unloading side of the vehicle and has a valve insert, which is fitted in the related connecting bore and has a connecting bore connected to the throttle bore via an annular groove and ending axially in a valve seat. A sealing block, which is in contact with the related spring disk on the side oriented away from the valve seat, is provided with a sealing element on the side oriented towards the valve seat and is pressed against the valve plate by a compression spring.

In this preferred embodiment, therefore, the connecting line, the throttle and the shut-off valve are integrated in the valve block without requiring additional space. When, upon opening the level-regulating valve concerned, the associated valve plate is displaced by the related control piston against the restoring force of the compression spring in the direction of the associated connecting bore, at the same time, the sealing block of the shut-off valve is pressed by the spring disk against the restoring force of the related compression spring onto the associated valve seat and the connecting bore is therefore closed. The throttled connection between the connecting bores of the two level-regulating valves via the throttle bore is therefore blocked, as planned.

In another embodiment, the shut-off valve is configured to be activatable mechanically and is coupled to the main pressure valve such that the shut-off valve is open when the main pressure line is connected to the compressed air source and is closed when the main pressure line is connected to the compressed air sink. In order to make it possible in a simple and low-cost manner to shut off via the shut-off valve the throttled connection between the at least two spring bellows during one-sided raising and lowering of the vehicle superstructure, and in the case of unequal pressure charging of the spring bellows, the shut-off valve is configured to be activatable mechanically and is coupled to the main pressure valve such that the shut-off valve is open when the main pressure line is connected to the compressed air source and is closed when the main pressure line is connected to the compressed air sink.

The shut-off valve is therefore closed automatically via the main pressure valve when the main pressure line is connected via the main pressure valve to the compressed air sink, that is, depressurized. The shut-off valve is therefore closed both during one-sided venting, for example of the spring bellows arranged on the loading/unloading side of the vehicle, and during joint venting of both spring bellows. In the case of one-sided charging, for example of the spring bellows arranged on the loading/unloading side of the vehicle, the shut-off valve is open during the raising of the vehicle superstructure on the side of the vehicle concerned and connects the main pressure line to the compressed air source, usually formed by an accumulator. A pressure compensation between the spring bellows possible in this case is, however, limited by the throttle and can be rapidly ended by switching over the main pressure valve after the vehicle superstructure has been raised.

When the main pressure valve is in its inactive position in which the main pressure line is depressurized, which is the case outside charging and venting processes and especially during driving, the shut-off valve is closed and a pressure compensation between the two spring bellows is therefore not possible. If, however, a limited pressure compensation between the two spring bellows is nevertheless desired, it can be made possible in a simple manner by the switching over of the main pressure valve and the associated opening of the shut-off valve.

In this case, too, in order to reduce assembly costs the connecting line, the throttle and the shut-off valve, at least together with the main pressure valve, should be arranged in a common valve block, which, with a largely coaxial arrangement of the two switching valves inside a common valve bore, requires only the use of a single valve block. However, the switching valves and components, together with the two level-regulating valves of the vehicle axle concerned, and further level-regulating valves the spring bellows of which are associated with the air springs of other vehicle axles, may also be combined in a common valve block.

Still other objects and advantages of the present invention will in part be obvious and will in part be apparent from the specification.

The present invention accordingly comprises the features of construction, combinations of elements, and arrangement of parts, all as exemplified in the constructions herein set forth, and the scope of the invention will be indicated in the claims.

BRIEF DESCRIPTION OF THE DRAWINGS

The invention is explained in greater detail below using exemplary embodiments and with reference to the accompanying drawing figures, in which.

Figure 1:
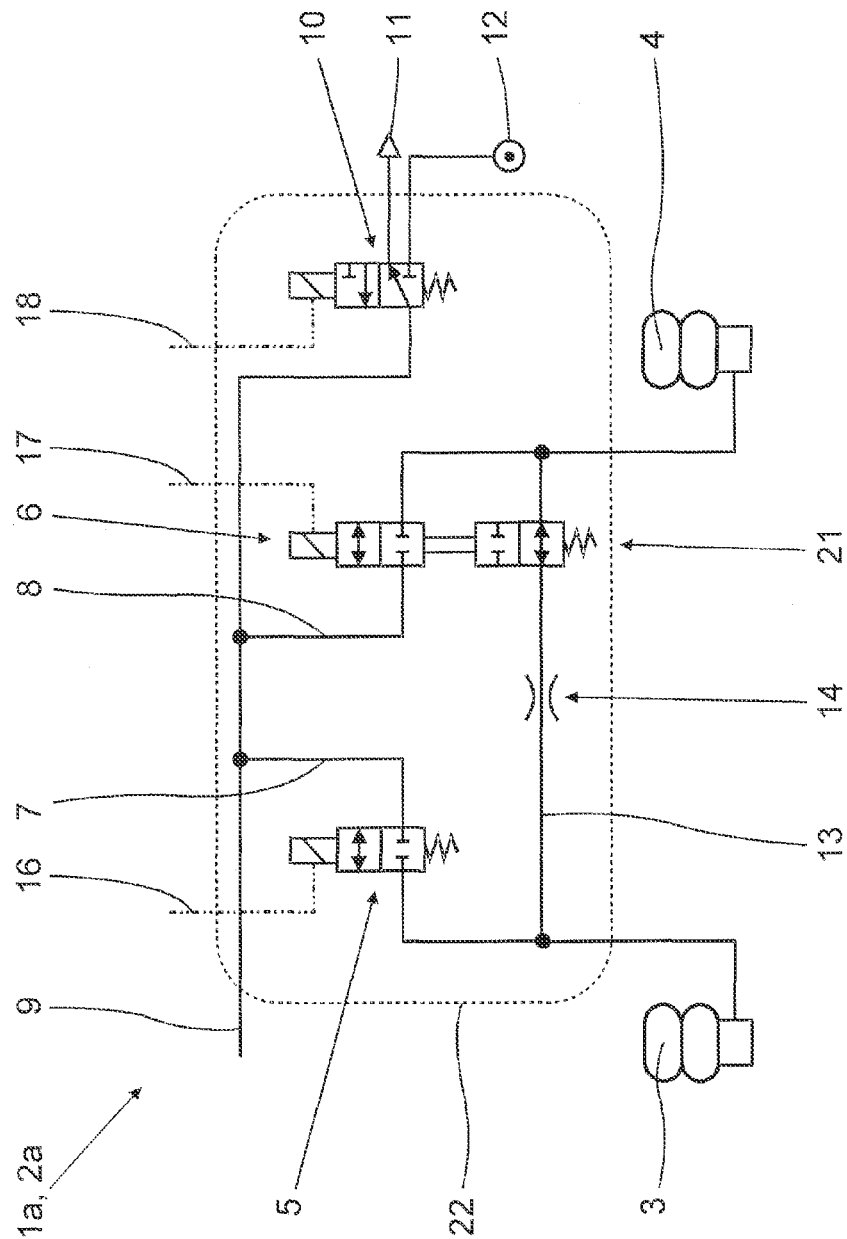
FIG. 1 shows the schematic structure of the valve arrangement of a first embodiment of the air suspension system of a motor vehicle according to the invention.

LIST OF REFERENCE CHARACTERS 1a-1c Air suspension system
2a-2c Valve arrangement
3 First or left-hand spring bellows
4 Second or right-hand spring bellows
5, 5' First level-regulating valve
6, 6' Second level-regulating valve
7 First connecting line
8 Second connecting line
9 Main pressure line
10 Main pressure valve
11 Compressed air sink
12 Compressed air source
13, 13' Connecting line
14 Throttle
15 Shut-off valve
16 Electrical control line
17 Electrical control line
18 Electrical control line
19 Electrical control line
20 Quadruple valve block
21, 21' Shut-off valve
22, 22' Triple valve block
23 First valve bore
24 Second valve bore
25 Housing
26 First compression spring, helical spring
27 Second compression spring, helical spring
28 First valve disk
29 Second valve disk
30 First valve seat
31 Second valve seat
32 First valve plate
33 Second valve plate
34 First control piston
35 Second control piston
36 Throttle bore
37 Connecting cover
38 First connecting bore
39 Second connecting bore
40 Valve insert
41 Annular groove
42 Valve seat
43 Connecting bore
44 Sealing block
45 Sealing element
46 Third compression spring, helical spring
47 Shut-off valve
48 Triple valve block

DETAILED DESCRIPTION OF THE PREFERRED EMBODIMENTS

Figure 4:
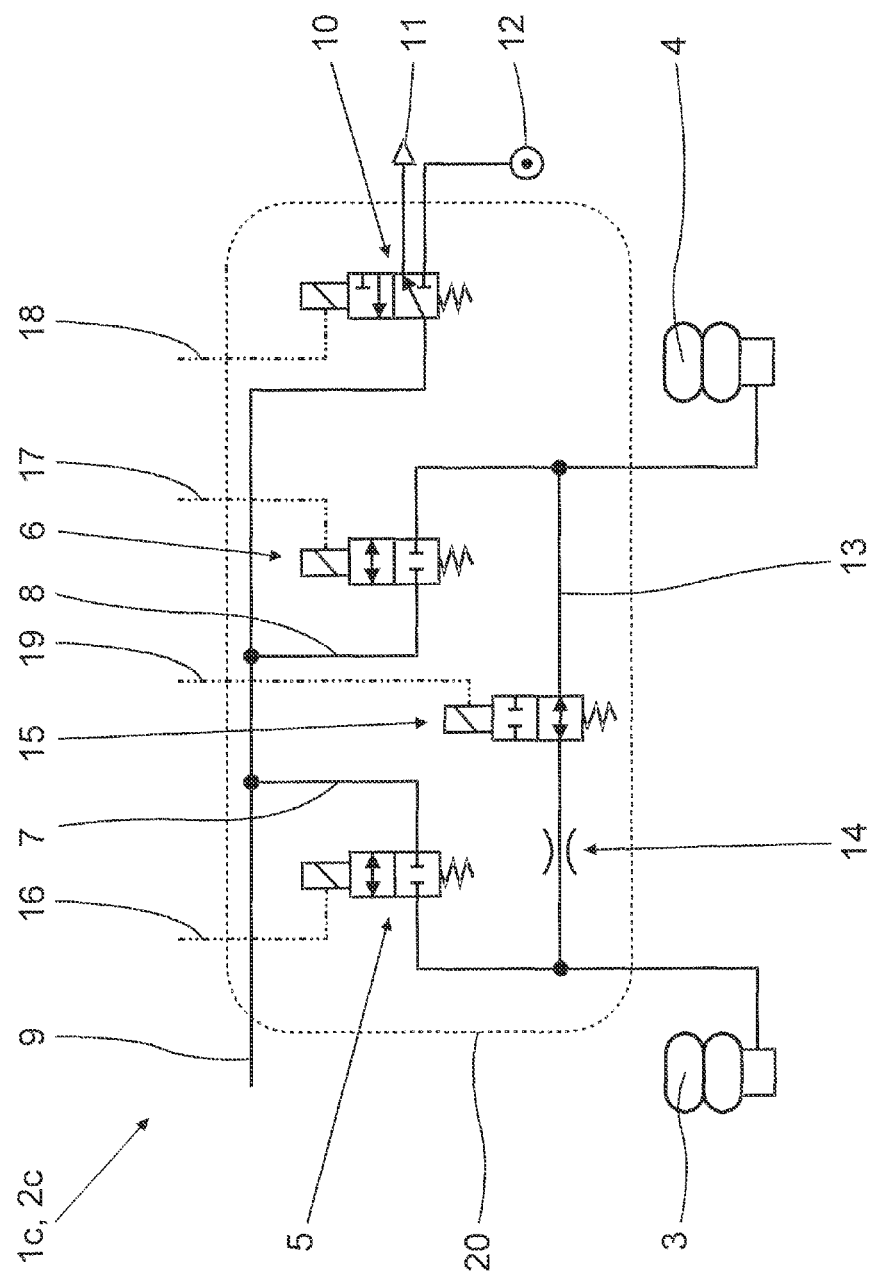
FIG. 4 shows the schematic structure of the valve arrangement of a known air suspension system of a motor vehicle.

A valve arrangement 2c, represented in schematic form in FIG. 4, of a known air suspension system 1c of a motor vehicle comprises a first spring bellows 3 and a second spring bellows 4, which are associated with air springs arranged on opposite vehicle sides of a vehicle axle and can be connected to and shut off from a main pressure line 9 via respective connecting lines 7, 8 each provided with a level-regulating valve 5, 6. The level-regulating valves 5, 6 are in the form of 2/2-way solenoid switching valves, which are closed in a first switching position (inactive position) and are open in a second switching position (actuating position). In addition, a main pressure valve 10 in the form of a 3/2-way solenoid switching valve is present, via which main pressure valve 10 the main pressure line 9 is connected to a compressed air sink 11, for example to the ambient air, in a first switching position (inactive position), and to a compressed air source 12, for example an accumulator, in a second switching position (actuating position).

The connecting lines 7, 8 of the two spring bellows 3, 4 are connected to one another via a connecting line 13, which is provided with a throttle 14 and can be shut off by a shut-off valve 15. The shut-off valve 15 is in the form of a 2/2-way solenoid switching valve, which is open in a first switching position (inactive position) and closed in a second switching position (actuating position). The solenoids of the solenoid switching valves 5, 6, 10, 15 are each connected via a respective electrical control line 16, 17, 18, 19 to an electronic control unit (not shown in detail). In the present case, the solenoid switching valves 5, 6, 10, 15 and the connecting line 13 with the throttle 14 are combined in a quadruple valve block 20 by way of example.

The two spring bellows 3, 4 can be charged independently of one another by opening the associated level-regulating valve 5, 6 when the main pressure valve 10 is in its actuating position and the main pressure line 9 is consequently connected to the compressed air source 12. Likewise, the two spring bellows 3, 4 can be vented independently of one another by opening the associated level-regulating valves 5, 6 when the main pressure valve 10 is in its inactive position and the main pressure line 9 is consequently connected to the compressed air sink 11, that is, depressurized. The throttled connection between the two spring bellows 3, 4 via the connecting line 13 provided with the throttle 14 can be shut off, that is interrupted, as required, by actuation of the shut-off valve 15. The configuration of the shut-off valve 15 as a solenoid shut-off valve represents a certain cost factor and is associated with an increased risk of malfunction. In addition, in the closed state, the shut-off valve must disadvantageously be held in its actuating position by means of electrical energy.

By contrast, a valve arrangement 2a, represented in schematic form in FIG. 1, of a first embodiment of the air suspension system 1a of a motor vehicle according to the invention has a mechanically activatable shut-off valve 21, which is coupled mechanically to one level-regulating valve 6 of the two level-regulating valves 5, 6 such that the shut-off valve 21 is open when the level-regulating valve 6 is closed and is closed when the level-regulating valve 5, 6 is open. In the present case the level-regulating valve 6 in question is the one which is associated with the spring bellows 4 arranged on the loading/unloading side of the vehicle, that is, the right-hand spring bellows 4 in the case of a motor vehicle provided to drive on the right. In the case of a vehicle provided to drive on the left, the shut-off valve 21 would be coupled correspondingly to the level-regulating valve 5 associated with the left-hand spring bellows 3 of the vehicle axle concerned.

The shut-off valve 21 is therefore closed automatically via the related level-regulating valve 6 when the level-regulating valve 6 is opened for one-sided charging or venting of the spring bellows 4 arranged on the loading/unloading side of the vehicle, that is, for one-sided raising or lowering of the vehicle superstructure. If, however, the related level-regulating valve 6 is closed, which is the case outside charging and venting processes, and especially while driving, the shut-off valve 21 is open and a small exchange of pressure and air between the two spring bellows 3, 4 is therefore possible.

However, automatic closing of the shut-off valve 21 in the case of unequal charging of the spring bellows 3, 4 to compensate for a laterally unequal load distribution is not possible with this valve arrangement 2a. Because the shut-off valve 21 and the related level-regulating valve 6 can be arranged largely coaxially inside a common valve bore, a triple valve block 22 is sufficient for combining the four switching valves 5, 6, 10, 21, together with the connecting line 13 provided with the throttle 14.

Figure 2:
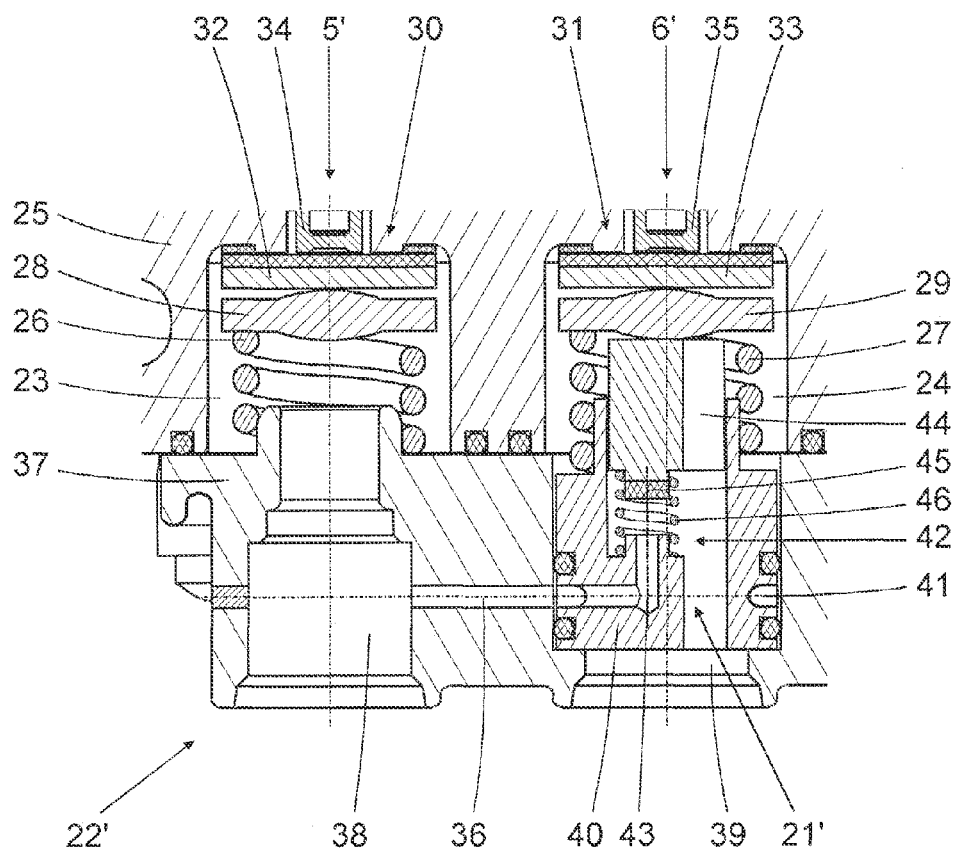
FIG. 2 shows a preferred structure of a valve block of the air suspension system according to the invention as shown in FIG. 1 in a sectional view.

A preferred structure of such a valve block 22' of the air suspension system 1a as shown in FIG. 1 is represented partially in a sectional view in FIG. 2. In this valve block 22', in contrast to the schematic representation of FIG. 1, the two level-regulating valves 5', 6' are in the form of seat valves, which are arranged in radially adjacent valve bores 23, 24 of a housing 25 of the valve block 22' and each have a valve plate 32, 33, which is pressed against a valve seat 30, 31 by a compression spring 26, 27 in the form of a helical spring via a spring disk 28, 29. In order to open the two level-regulating valves 5', 6', the respective valve plate 32, 33 is pressed downwards against the restoring force of the related compression spring 26, 27 by an associated control piston 34, 35, which in turn is impinged upon by compressed air via a pilot valve.

In the present case, the connecting line 13 and the throttle 14 of FIG. 1 are configured as a throttle bore 36, which connects to one another, with regard to flow, connecting bores 38, 39 of the two level-regulating valves 5', 6' arranged in a connecting cover 37 of the valve block 22'.

The shut-off valve 21' is also in the form of a seat valve arranged inside the second level-regulating valve 6' of the spring bellows 4 on the loading/unloading side of the vehicle. The shut-off valve 21' includes a valve insert 40, which is fitted into the related connecting bore 39 and has a connecting bore 43 connected via an annular groove 41 to the throttle bore 36 and ending axially in a valve seat 42, together with a sealing block 44. On its side facing away from the valve seat 42, the sealing block 44 is in contact with the related spring disk 29 of the second level-regulating valve 6' and, on its side facing towards the valve seat 42, is provided with a sealing element 45. In addition, the sealing block 44 is pressed by a third compression spring 46 in the form of a helical spring against the spring disk 29, this third compression spring 46 bearing with its other end against the valve insert 40.

In this preferred embodiment, therefore, the connecting line 13 (see FIG. 1) formed by the throttle bore 36, the throttle 14 (see FIG. 1) and the shut-off valve 21', are integrated in the valve block 22' without requiring additional space. When, in opening the second level-regulating valve 6', the associated valve plate 33 is displaced by the associated control piston 35 against the restoring force of the compression spring 27 in the direction of the associated connecting bore 39, at the same time the sealing block 44 of the shut-off valve 21' is pressed by the spring disk 29 against the restoring force of the third compression spring 46 onto the associated valve seat 42, and the connecting bore 43 is therefore closed. The throttled connection via the throttle bore 36 between the connecting bores 38, 39 of the two level-regulating valves 5', 6' is therefore blocked.

Figure 3:
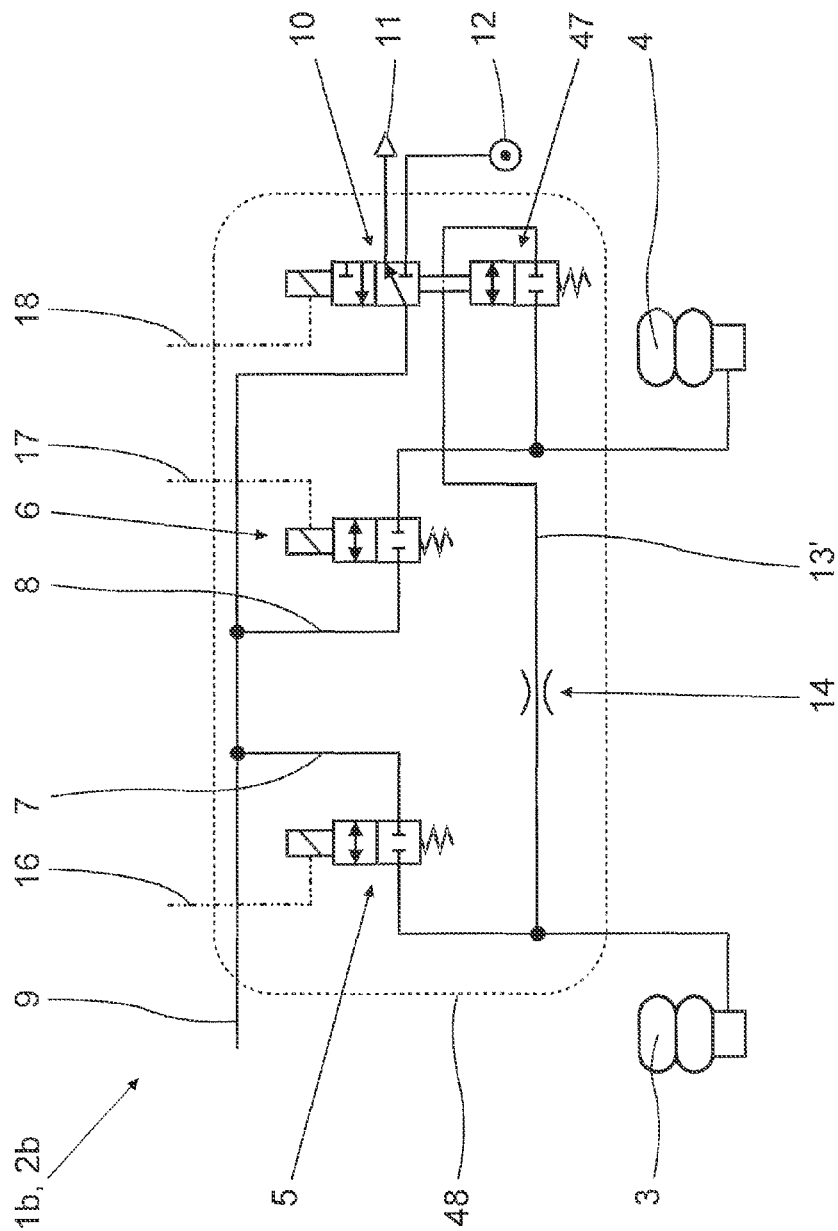
FIG. 3 shows the schematic structure of the valve arrangement of a second embodiment of the air suspension system of a motor vehicle according to the invention.

Unlike the valve arrangement 2c of the known air suspension system 1c as shown in FIG. 4, a valve arrangement 2b, represented in schematic form in FIG. 3, of a second embodiment of the air suspension system 1b of a motor vehicle according to the invention has a mechanically activatable shut-off valve 47 that is coupled to the main pressure valve 10 such that the shut-off valve 47 is open when the main pressure line 9 is connected to the compressed air source 12 and is closed when the main pressure line 9 is connected to the compressed air sink 11. Correspondingly, the connecting line 13' now passes via the shut-off valve 47 arranged largely coaxially in a common valve bore with the main pressure valve 10. The first level-regulating valve 5, the second level-regulating valve 6, the main pressure valve 10, the shut-off valve 47 and the connecting line 13' provided with the throttle 14 are combined in a triple valve block 48.

In this valve arrangement 2b the shut-off valve 47 is therefore closed automatically upon actuation of the main pressure valve 10, namely, when the main pressure line 9 is connected via the main pressure valve 10 to the compressed air sink 11, that is, depressurized. The shut-off valve 47 is therefore closed both during one-sided venting, for example of the spring bellows 4 arranged on the loading/unloading side of the vehicle, and also during joint venting of both spring bellows 3, 4. During one-sided charging, for example of the spring bellows 4 arranged on the loading/unloading side of the vehicle, the shut-off valve 47 is open on the related side of the vehicle during the raising of the vehicle superstructure and connects the main pressure line 9 to the compressed air source 12, usually formed by an accumulator. A pressure compensation between the spring bellows 3, 4 possible in this case is, however, limited by the throttle 14 and can be rapidly ended by switching over the main pressure valve 10 after the vehicle superstructure has been raised.

When the main pressure valve 10 is in its inactive position in which the main pressure line 9 is depressurized, which is the case outside charging and venting processes, and especially while driving, the shut-off valve 47 is closed and a pressure compensation between the two spring bellows 3, 4 is therefore not possible. However, if a limited pressure compensation between the two spring bellows 3, 4 is nevertheless desired, it can be enabled in a simple manner by switching-over of the main pressure valve 10 and the associated opening of the shut-off valve 47. Although the main pressure line 9 is pressurized as this happens, the first and second level-regulating valves 5, 6 are unactuated, that is, are closed. In this actuating position of the shut-off valve 47 (shut-off valve 47 is open and main pressure line 9 is pressurized) a pressure compensation is, however, also possible while driving, in that the first or the second level-regulating valve 5, 6 or both level-regulating valves 5, 6 is/are open in order to charge the respective associated spring bellows or both spring bellows 3, 4.

In a practical embodiment, the combination of main pressure valve 10 and shut-off valve 47 operatively connected as shown in FIG. 3 could be constructed identically or similarly to the level-regulating valve 6' represented in the right-hand half of the drawing in FIG. 2. Reference is therefore also made to the relevant description.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A vehicle air suspension system, comprising at least two spring bellows associated with air springs disposed on opposite vehicle sides of an axle of the vehicle, the at least two spring bellows being one of connected to and shut off from a main pressure line via connecting lines having level-regulating valves, the main pressure line being connectable via a main pressure valve alternately to a compressed air source and to a compressed air sink, the connecting lines being connected to one another via a further connecting line having a throttle; and a mechanically activatable shut-off valve coupled to one of the level-regulating valves of the spring bellows such that the mechanically activatable shut-off valve is open when the coupled one of the level-regulating valves is closed and is closed when the coupled one of the level-regulating valves is open.

2. The air suspension system as claimed in claim 1, wherein the further connecting line, the throttle, the mechanically activatable shut-off valve, and the level-regulating valves are disposed in a common valve block.

3. A vehicle air suspension system, comprising at least two spring bellows associated with air springs disposed on opposite vehicle sides of an axle of the vehicle, the at least two spring bellows being one of connected to and shut off from a main pressure line via connecting lines having seat valves, the main pressure line being connectable via a main pressure valve alternately to a compressed air source and to a compressed air sink, the connecting lines being connected to one another via a throttle bore; and a mechanically activatable shut-off valve coupled to one of the seat valves such that the mechanically activatable shut-off valve is open when the coupled one of the seat valves is closed and is closed when the coupled one of the seat valves is open, the mechanically activatable shut-off valve and the seat valves being disposed in a common valve block, wherein the seat valves are arranged in radially adjacent valve bores of a housing of the valve block, the seat valves having valve plates pressed against valve seats by compression springs via spring disks, wherein the throttle bore connects connecting bores of the seat valves to one another in a connecting cover of the valve block, wherein the mechanically activatable shut-off valve is a further seat valve disposed inside the coupled one of the seat valves, and wherein the mechanically activatable shut-off valve has (i) a valve insert fitted into one of the connecting bores, (ii) a further connecting bore connected via an annular groove to the throttle bore and ending axially in a valve seat, and (iii) a sealing block in contact with one of the spring disks on a side facing away from the valve seat, the sealing block including a sealing element on a side facing towards the valve seat, the sealing block being pressed against the contacted one of the spring disks by a further compression spring.

4. A vehicle air suspension system, comprising at least two spring bellows associated with air springs arranged on opposite vehicle sides of an axle of the vehicle, the at least two spring bellows being one of connected to and shut off from a main pressure line via connecting lines having level-regulating valves, the main pressure line being connectable via a main pressure valve alternately to a compressed air source and to a compressed air sink, the connecting lines being connected to one another via a further connecting line having a throttle; and a mechanically activatable shut-off valve coupled to the main pressure valve such that the shut-off valve is open when the main pressure line is connected to the compressed air source and is closed when the main pressure line is connected to the compressed air sink.

5. The air suspension system as claimed in claim 4, wherein the connecting lines, the throttle, the shut-off valve, and the main pressure valve are disposed in a common valve block.

6. The air suspension system as claimed in claim 4, wherein the mechanically activatable shut-off valve is configured to open and close the further connecting line.

7. The air suspension system as claimed in claim 4, wherein the mechanically activatable shut-off valve is disposed between the at least two spring bellows.

* * * * *